United States Patent
Mehrl et al.

(10) Patent No.: US 10,393,851 B2
(45) Date of Patent: Aug. 27, 2019

(54) POLYHEDRAL SENSOR ARRANGEMENT AND METHOD FOR OPERATING A POLYHEDRAL SENSOR ARRANGEMENT

(71) Applicant: ams AG, Unterpremstaetten (AT)

(72) Inventors: David Mehrl, Plano, TX (US); Kerry Glover, Rockwall, TX (US)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 15/811,473

(22) Filed: Nov. 13, 2017

(65) Prior Publication Data

US 2018/0081022 A1 Mar. 22, 2018

Related U.S. Application Data (62) Division of application No. 14/636,117, filed on Mar. 2, 2015, now abandoned.

(Continued)

(30) Foreign Application Priority Data

Mar. 5, 2014 (EP) .................................... 14157910

(51) Int. Cl.
*G01S 3/786* (2006.01)
*F24S 50/20* (2018.01)
(Continued)

(52) U.S. Cl.
CPC ............. *G01S 3/7862* (2013.01); *F24S 50/20* (2018.05); *G01J 1/0242* (2013.01);
(Continued)

(58) Field of Classification Search
CPC ........ F24S 50/20; G01J 1/0242; G01J 1/0403; G01J 1/4204; G01J 1/4228; G01S 3/782; G01S 3/786; G01S 5/163
(Continued)

(56) References Cited

U.S. PATENT DOCUMENTS 3,729,260 A * 4/1973 Walsh .................... G01S 3/786
356/510
4,102,326 A 7/1978 Sommer
(Continued)

FOREIGN PATENT DOCUMENTS

| CN | 101750068 A | 6/2010 |
| DE | 102009045031 A1 | 3/2011 |

OTHER PUBLICATIONS

"How to build a simple light meter", Jan. 31, 2013, Retrieved from <http://www.reddit.com/r/HandsOnComplexity/related/17nym1/how_to_build_a_simple_light_meter/> (retrieved on Jun. 26, 2014), pp. 1-3, figure 1.
(Continued)

*Primary Examiner* — Que Tan Le
(74) *Attorney, Agent, or Firm* — Fish & Richardson P.C.

(57) ABSTRACT

A sensor arrangement comprises at least a first, a second, and a third light sensor. A three-dimensional framework comprises at least a first, a second, and a third connection means which are connected to the at least first, second, and third light sensor, respectively. The first, the second, and the third connection means are configured to align the at least first, second, and third light sensor along a first, second, and third face of a polyhedron-like volume, respectively, such that the sensor arrangement encloses the polyhedron-like volume. The invention also relates to a method for operating the sensor arrangement.

18 Claims, 2 Drawing Sheets

Related U.S. Application Data (60) Provisional application No. 61/946,951, filed on Mar. 3, 2014.

(51) Int. Cl.
  *G01J 1/04* (2006.01)
  *G01J 1/02* (2006.01)
  *G01J 1/10* (2006.01)
  *G01J 1/42* (2006.01)
  *G01S 3/782* (2006.01)
  *G01S 3/781* (2006.01)
  *G01S 5/16* (2006.01)

(52) U.S. Cl.
  CPC .............. *G01J 1/0403* (2013.01); *G01J 1/10* (2013.01); *G01J 1/4204* (2013.01); *G01J 1/4228* (2013.01); *G01S 3/781* (2013.01); *G01S 3/782* (2013.01); *G01S 3/786* (2013.01); *G01S 5/163* (2013.01)

(58) Field of Classification Search
  USPC .............................................. 250/203.4, 239
  See application file for complete search history.

(56) References Cited

U.S. PATENT DOCUMENTS

| | | |
|---|---|---|
| 4,220,412 A | 9/1980 | Shroyer et al. |
| 4,225,781 A | 9/1980 | Hammons |
| 4,361,758 A | 11/1982 | Rotolo |
| 4,609,288 A | 9/1986 | Dodge |
| 4,611,914 A | 9/1986 | Homma |
| 5,393,970 A | 2/1995 | Shau et al. |
| 6,355,925 B1 | 3/2002 | Robles et al. |
| 7,522,211 B2 | 4/2009 | Lee et al. |
| 7,608,811 B2 | 10/2009 | Ma |
| 8,581,164 B2 | 11/2013 | Wu et al. |

OTHER PUBLICATIONS

"Near Space Sun Sensor", Dec. 9, 2012, Retrived from <http://nearsys.com/catalog/sensor/ssensor.pdf> (retrieved on Jun. 26, 2014), pp. 1-8, figure 1.

Sastry, Shankar et al.: "Attitude Control for a Micromechanical Flying Insect via Sensor Output Feedback", IEEE Transactions on Robotics and Automation, vol. 20, No. 1, Feb. 1, 2004, pp. 93-106.

Tambo, Toyokazu et al.: "Search Method of Sun Using Fixed Five Photodiode Sensor", IEEJ Transactions on Sensors and Micromachines, Feb. 1, 2009; vol. 129, No. 2, pp. 53-59. DOI: 10.1541/ieejsmas.129.53, figure 1.

TSL2772 Datasheet, "Light-to-digital converter with proximity sensing", TAOS 131, Dec. 2011, pp. 1-34.

Wu, Wei-Chung et al.: "Biometric Sensor Suite for Flight Control of a Micromechanical Flying Insect Design and Experimental Results", Proceedings of the 2003 IEEE International Conference on Robotics & Automation, Taipei, Taiwan, Sep. 14-19, 2003, pp. 1146-1151.

\* cited by examiner

POLYHEDRAL SENSOR ARRANGEMENT AND METHOD FOR OPERATING A POLYHEDRAL SENSOR ARRANGEMENT

CROSS-REFERENCES TO RELATED APPLICATIONS

The present application is a divisional application of U.S. patent application Ser. No. 14/636,117 entitled "SENSOR ARRANGEMENT WITH LIGHT SENSORS ALIGNED WITH RESPECT TO A THREE-DIMENSIONAL COORDINATE SYSTEM," filed on Mar. 2, 2015, which claims the benefit of priority from Provisional Patent Application No. 61/946,951, filed on Mar. 3, 2014, and claims the benefit of priority of European Patent Office Patent Application 14157910.2 filed on Mar. 5, 2014, all of which are hereby incorporated by reference in their entirety for all purposes.

BACKGROUND OF THE INVENTION

This invention relates to a sensor arrangement and to a method for operating a sensor arrangement.

Generally, ambient light sensing is the ability to measure the brightness of light incident on a surface. Ambient light sensors such as lux meters, however, strive to sense light in a somewhat directionally invariant manner. Typically, these sensors use a diffuser dome placed over the light sensitive surface, which removes all directional information from ambient light signals. The sensor characteristic typically takes the form of a modified cosine response. In addition, the use of a diffuser dome attenuates the response, making the ambient light sensor less sensitive.

However, there are many applications of ambient light sensor that can benefit from the ability to sense the direction of incident light. Such applications include solar tracking, e.g. for automated tracking of solar panels and controlling of automated window blinds in a modern house. Furthermore, directional ambient light sensors could be used for controlling a car's rear view mirror at night or dimming the headlights in a car. In sun- or moonlit applications, directional ambient light sensors could even be used as an inexpensive navigation method. For example, a remote controlled (R/C) boat would be able to autonomously find its way back to shore if the boat accidentally got out of range of the R/C transmitter. Even further advanced applications are possible, navigation of a car, for example.

The objective of this invention is to provide a sensor arrangement and a method for operating a sensor arrangement that improves on directional light sensing.

This object is solved by the subject matter of the independent claims. Further developments and embodiments relate to dependent claims.

SUMMARY OF THE INVENTION

According to an aspect of the invention, a sensor arrangement comprises at least a first, a second, and a third light sensor. A three-dimensional framework comprises at least a first, a second, and a third connection means. These connection means are connected to the at least first, second, and third light sensors, respectively. The first, the second, and the third connection means are configured to align the at least first, second, and third light sensor along faces of a polyhedron-like volume. In particular, the first light sensor is aligned along a first face, the second light sensor is aligned along a second face, and the third light sensor is aligned along a third face of the polyhedron-like volume, respectively. The three-dimensional framework and, more particularly, the connection means, align the light sensors such that the sensor arrangement encloses the polyhedron-like volume.

In operation of the sensor arrangement, the individual light sensors generate first, second, and third sensor signals as a response to incident light. As the respective light sensors are positioned along different faces of the polyhedron-like volume, the sensor signals are depending on the three-dimensional structure of the polyhedron-like volume. In fact, the sensor signals become dependent on the orientation of the face of the polyhedron-like volume that they are aligned to. Thus, the specific population of light sensors along faces of the polyhedron-like volume determines a region of interest from which the light sensors can detect light. The region of interest describes the field of view of the sensor arrangement. For example, the sensors can detect light from a certain region, from a hemisphere, or even from all directions (omnidirectional sensing). In turn, the sensor signals are indicative of a direction or position of a light-source to be detected.

The proposed sensor arrangement uses multiple sensors placed in a three-dimensional geometry determined by the geometry of polyhedron-like volume. It offers the ability of sensing the direction of incident light and/or sensing light intensity of a light-source within the region of interest. Furthermore, if a light-source is limited to move and emit within only within that region of interest the sensing can be invariant to the direction of the incident light. This approach can be used to create a truly omnidirectional light sensor that does not need to use a diffuser.

According to another aspect of the invention, the first, the second, and the third light sensor are aligned with their light-sensitive surfaces facing away from the polyhedron-like volume. In this context, a surface can be assigned to the polyhedron-like volume for illustration. The light-sensitive surfaces of the light sensors are then facing away from the surface of the polyhedron-like volume.

Furthermore, the first, the second, and the third light sensor are configured to detect light from within a continuous region of interest depending on the polyhedron-like volume. A continuous region of interest can be established by aligning the respective light sensors in a way that their individual fields of view are at least partially overlapping or border on each other. In this way, light is only detected from within the continuous region of interest.

The detected intensity of light from the continuous region of interest may be compared with a predetermined value expected to be emitted from the light-source. This feature can be used for implementing a tracking mechanism based on sensor signals generated by the sensor arrangement. In fact, the light sensors typically detect different light intensities, which should sum up to yield the predetermined value. The position of the light-source can be determined from such relative light intensities.

According to another aspect of the invention, the at least first, second, and third light sensor are aligned with respect to a three-dimensional coordinate system. Generally, the three-dimensional coordinate system does not have to be aligned with the geometry of the polyhedron-like volume. In order to reduce computational effort for processing the sensor signals, however, it may be useful to align the three-dimensional coordinate system with respect to the polyhedron-like volume.

Furthermore, the at least first, second, and third light sensor have a sensor response characteristic which renders their sensor signals proportional to a directional cosine in the three-dimensional coordinate system (cosine response).

According to another aspect of the invention, the at least first, second, and third light sensors comprise a photodiode, a Complementary Metal Oxide Semiconductor (CMOS) light detector, and/or a CCD, respectively. In another embodiment, photodiodes sensitive to infrared light are implemented as these can reside behind optically opaque material so that they are not visible when built into a device.

According to another aspect of the invention, the at least first, second, and third light sensors comprise a color sensor, respectively. The color sensor can be a dedicated color sensor, which by construction is sensitive to different wavelengths of light. However, the color sensor may comprise several sensors of the same type, e.g. photodiodes, which are provided with one or more filters of different transmission characteristics to render their sensor signals dependent on color.

According to another aspect of the invention, the three-dimensional framework comprises the polyhedron-like volume. In particular, the three-dimensional framework comprises a solid body having the polyhedron-like volume. The first, second, and third connection means then constitute the first, second, and third faces of the polyhedron-like volume. Furthermore, the connection means are configured to provide electrical terminals to the at least first, second, and third light sensor.

In this case, when the three-dimensional framework has the polyhedron-like volume, the light sensors can be directly connected to the different faces of the volume. In a certain sense, the three-dimensional framework constitutes a base to which the light sensors can be connected and aligned.

According to another aspect of the invention, the three-dimensional framework comprises a grid having an envelope comprising the polyhedron-like volume. If a three-dimensional framework is designed as a grid, the first, second, and third connection means could be designed as interconnections having a central portion from which the connection means spread out to connect the individual light sensors.

Generally, the light sensors are mounted on an integrated circuit board and these circuit boards could be connected to each other so as to also comprise the polyhedron-like volume.

According to another aspect of the invention, the polyhedron-like volume comprises a four-faceted pyramid or a frustum thereof. In particular, the polyhedron-like volume comprises a pyramid with a square base or a frustum thereof. Then, the at least first, second, and third light sensors are aligned along the at least first, second, and third face of the four-facetted pyramid or the frustum thereof. Furthermore, a fourth light sensor is aligned to a fourth face on the four-faceted pyramid or the frustum thereof. A frustum is the portion of a volume, e.g. a cone or pyramid that lies between two parallel planes cutting it.

According to another aspect of the invention, the polyhedron-like volume comprises a cube. The first, second, and third light sensors are aligned along the at least first, second, and third face of the cube. Furthermore, the fourth light sensor is aligned along the fourth face of the cube.

According to another aspect of the invention, a fifth light sensor and/or a sixth light sensor is/are aligned a fourth and/or a sixth face of the cube.

Using five light sensors, the direction of light can be sensed over a hemisphere. Furthermore, by using six sensors the direction of light incident on the sensor arrangement can be sensed over a full sphere (light incident from any direction in three-dimensional space). The same geometrical setup or sensor arrangement also allows omnidirectional, i.e. truly directional invariant, sensing over a full hemisphere or full sphere.

A further aspect of the invention relates to a method for operating a sensor arrangement comprising at least a first, a second, and a third light sensor wherein each light sensor is aligned along a face of a polyhedron-like volume, respectively, so that the sensor arrangement encloses the polyhedron-like volume. The method comprises the following steps:

Firstly, collect from the at least first, second, and third light sensor respective sensors signals depending on a light source to be detected. Then, determine from the collected sensor signals projections onto the principal axes of a three-dimensional coordinate system. Finally, determine from the determined projections a direction of the light source to be detected with respect to the three-dimensional coordinate system.

The proposed method makes use of multiple sensors placed in a three-dimensional geometry determined by the polyhedron-like volume to provide directional sensing. In particular, it offers the ability of sensing the direction of incident light and/or sensing light intensity of a light-source within a region of interest determined by the alignment of the light sensors. Furthermore, if a light-source is limited to move and emit within only within that region of interest the sensing can be invariant to the direction of the incident light. This approach can be used to create a truly omnidirectional light sensor that does not need to use a diffuser.

According to another aspect of the invention, the method further comprises the step of aligning the at least first, second, and third light sensors. The alignment is defined with respect to the principal axes of the three-dimensional coordinate system, respectively, i.e. the sensor signals relate to principal axes.

According to another step of the invention, the step of aligning the at least first, second, and third light sensors involves defining a continuous region of interest into which the light source to be detected emits a predetermined amount of light.

In this way, light is only detected from within the continuous region of interest. The detected intensity of light from the continuous region of interest may be compared with a predetermined amount expected to be emitted from the light-source. This feature can be used for tracking the position of the light-source based on sensor signals generated by the sensor arrangement. In fact, the light sensors typically detect different light intensities, which should sum up to yield the predetermined value. The position of the light-source can be determined from such relative light intensities.

According to another aspect of the invention, a relative brightness is determined from the sensor signals. This is determined by at least two alternatives or combinations thereof. According to a first alternative, the square root of the sum of squared sensor signals is taken. According to a second alternative, the square root of the sum of the squared difference signals is taken. The difference signals depend on the sensor signals and may account for ambient light as well.

According to another aspect of the invention, the steps of collecting sensor signals, determining the projections onto the principal axis and determining the direction of the light source to be detecting is continuously repeated so as to track the direction of the light source within the three-dimensional coordinate system.

In the following, the principle presented above will be described in more detail with respect to drawings in which exemplary embodiments are presented.

DETAILED DESCRIPTION

Figure 1A:
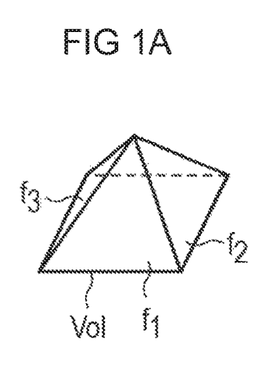
FIGS. 1A, 1B, IC show exemplary embodiments of a sensor arrangement according to the principle presented.
Figure 1B:
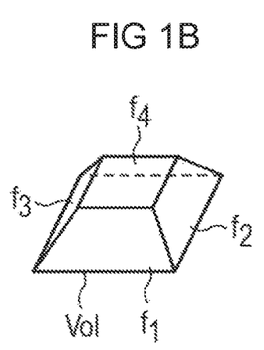
Figure 1C:
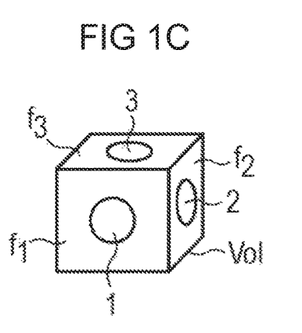

FIGS. 1A, 1B, IC show exemplary embodiments of a sensor arrangement according to the principle presented. Generally, the sensor arrangement comprises a polyhedron-like volume with individual light sensors connected and aligned along faces of the said volume.

Generally, the polyhedron-like volume can have the shape of any polyhedron or similar structures, e.g. a frustum of a polyhedron. According to a geometrical definition (see http://en.wikipedia.org/wiki/Polyhedron) a polyhedron is a three-dimensional shape that is made up of a finite number of polygonal faces which are parts of planes; the faces meet in pairs along edges which are straight-line segments, and the edges meet in points called vertices. Cubes, prisms and pyramids are examples of polyhedra. The polyhedron surrounds a bounded volume in three-dimensional space; sometimes this interior volume is considered to be part of the polyhedron, sometimes only the surface is considered, and occasionally only the skeleton of edges. FIG. 1A shows four-faceted pyramid, FIG. 1B shows a frustum thereof, and FIG. 1C shows a cube as examples of polyhedral-like volumes.

The polyhedron-like volume can be thought of as a reference framework. In the exemplary embodiments shown in FIGS. 1A, 1B, and 1C this framework is a solid body to which the light sensors are connected. The body has the polyhedron-like volume and comprises faces which constitute connection means to which the light sensors are (mechanically and electrically) connected. Furthermore, the faces may provide electrical terminals necessary to operate the sensor arrangement.

Alternatively, the framework can have a grid or skeleton design but its envelope comprises or encloses the polyhedron-like volume (not shown). In this design the framework is no solid body and the connection means rather are parts of the grid.

The light sensors are connected to the connection means or to faces of the polyhedron-like volume (indicated as spheres in the drawings). The light sensors comprise a photodiode, a Complementary Metal Oxide Semiconductor (CMOS) light detector, and/or a CCD, respectively. Photodiodes may be sensitive to infrared light. These can reside behind optically opaque material so that they are not visible.

The light sensors typically have a direction dependent detection characteristic. The term "cosine response" relates to the fact that the light sensors generate a sensor signal S which depends on a direction cosine when light is incident under some angle $\theta$, i.e. $S \propto \cos \theta$. The terms response and sensor signal will be used as equivalents hereinafter.

Figure 2:
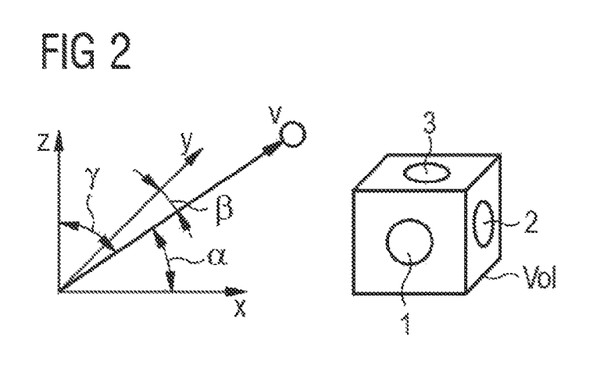
FIG. 2 shows an exemplary embodiment of the method for operating a sensor arrangement according to the principle presented.

FIG. 2 shows an exemplary embodiment of the method for operating a sensor arrangement according to the principle presented. The sensor arrangement can be used to track the position of a (point-like) light-source, such as the sun, and to determine the intensity of that light-source by using the exemplary method steps explained below. For example, under exposure to direct sunlight, i.e. clear skies, the response of light sensors can be evaluated to not only find the absolute intensity, but also the direction of the sun.

In this context, the exemplary embodiment is based on a sensor cube, e.g. with five faces of the cube are populated by respective light sensors, in particular by ambient light sensors, which all have a cosine response. The cube is depicted on the right side of the drawing in which a first, a second, and a third light sensor are visible. A fourth and a fifth light sensor are present but are connected to faces of the cube not visible in the drawing.

However, the sensor arrangement can be complemented by a sixth light sensor which can be connected to the remaining face of the cube and along $-a_z$. Whereas five light sensors on the cube can be used for sensing over a hemisphere, the addition of the sixth sensor allows for truly omnidirectional sensing. In the following both embodiments will be described in parallel and changes in the method will be highlighted.

The cube defines a three-dimensional coordinate system with principal axes x, y, z, for example a Cartesian coordinate system (see left side of FIG. 2). The coordinate system is described by the unit vectors $a_x$, $a_y$, and $a_z$, respectively. The light sensors are connected to the cube with their light sensitive surfaces aligned along $a_x$, $-a_x$, $a_y$, $-a_y$ and $a_z$ and oriented away from the surface of the cube. The sixth light sensor can be aligned along $-a_z$. In other words with the fife sensor cube one sensor, for example, the fifth light sensor, is oriented along the z-axis but not in the opposite direction. With the six sensor cube both directions are occupied.

For easier reference the light sensors will be referred to by their corresponding unit vectors, e.g. first light sensor $a_x$, second light sensor $-a_x$, third light sensor $a_y$, fourth light sensor $-a_y$, and fifth light sensor $a_z$. The sixth sensor, if present, will be referred to as $-a_z$.

For position determination or tracking of the sun it can be advisable to align the light sensors with respect to a fixed reference. This reference can be given by earth's magnetic field, for example. Hereinafter $X^+$ denotes north, $X^-$ south, $Y^+$ west, and $Y^-$ east. The z-axis is aligned facing upward and downward, which will be denoted as $Z^+$ and $Z^-$ hereinafter. In the following it is assumed that the first light sensor is aligned to north, the first light sensor is aligned north X+, the second light sensor X– is aligned south, the third light sensor is aligned west Y+, the fourth light sensor is aligned east Y–, and the fifth light sensor is aligned up. The sixth light sensor, if present, is aligned down.

After aligning the sensor arrangement in a next step the method for operating a sensor arrangement is initialized by evaluating the light sensors, i.e. by pairwise comparing the sensor signals Sx+, Sx–, Sy+, and Sy– of opposing sensors (i.e. $a_x$ vs. $-a_x$, then $a_y$ vs. $-a_y$). The light sensor that has larger response is chosen over its opposing one for further processing. This selection determines in which quadrant (or in the case of having a sixth sensor, which octant) of the coordinate system the light-source is positioned. In the coordinate system defined above there are four such quadrants, abbreviated as $X^+/Y^+$, $X^+/Y^-$, $X^-/Y^+$ and $X^-/Y^-$. In the case of six light sensors the pairwise comparing of the sensor signals also includes the opposing sensors $a_z$ vs. $-a_z$) in order to determine up/down orientation.

In this exemplary method, once the quadrant, and eventually up/down, has been determined the sensor signals of the remaining three sensors (i.e. the two $a_x$ and $a_y$ light sensors having the larger response, along with the $a_z$ or $-a_z$ light sensor) are selected and their sensor signals processed. The processing involves finding the length of the position vector V. For example, the light-source to be detected is the sun and its position is given by the position vector V having the coordinates $x_0$, $y_0$, and $z_0$ or in terms of angles, angle $\alpha$, $\beta$, and $\gamma$, which are given as the angles between the position vector and the x, y, and z axes, respectively (see drawing on the left side).

An arbitrary direction vector with coordinates x, y, z has a length l of $$l=\sqrt{x^2+y^2+z^2}.$$

The components of position vector V can be found by means of the scalar dot product or by projection onto the unit vectors $a_x$, $a_y$, and $a_z$, respectively. By definition the unit vectors have length one. In general terms the position vector V is given as $$V=V_x \cdot a_x + V_y \cdot a_y + V_z \cdot a_z,$$

wherein $V_x$, $V_y$, $V_z$ denote the vector components or magnitudes along the x, y, and z axes, respectively. In fact, $V_x$, $V_y$, $V_z$ are the projections of V onto the unit vectors $a_1$, $a_y$, and $a_z$, respectively. This means that $$V_x = V \cdot a_x, \; V_y = V \cdot a_y, \text{ and } V_z = V \cdot a_z.$$

The scalar dot product "·" can also be evaluated by taking the product of a vector's magnitude or length. For example, $V_x = V \cdot a_x = |V| \cdot |a_x| \cos(\alpha) = |V| \cos(\alpha)$, since $|a_x|=1$. Similarly, $V_y = |V| \cos(\beta)$ and $V_z = |V| \cos(\gamma)$.

For illustration purposes it is now assumed that three light sensors pointed along $X^+$, $Y^+$, and $Z^+$ have been selected. The light sensors (e.g. photodiodes) have a cosine angular response. For example, light incident on the sensor arrangement under vector V making an angle $\theta_x$ with a surface normal of the light sensor pointed in the $X^+$ direction will induce a response that is proportional to $V \cdot \cos(\alpha) = V \cdot a_x$. If, for example, all three light sensors pointed along $X^+$, $Y^+$, and $Z^+$ are aligned so that their fields of view are illuminated by the impinging light, then their respective responses will allow for measuring both the direction and the intensity of the incident light vector V, assuming either are matched, or can be matched by calibration, and have equal or known responsivity to the light.

The sensor response $S_z$ of the $a_z$ light sensor is proportional to the cosine of the sun's zenith angle $\gamma$, i.e. the angle of position vector V with the z axes (where the z axis is assumed to point upwards, e.g. towards the sky). It can also be shown that the sum of sensor signals of all light sensors should meet the following constraint:

$$\cos^2(\alpha)+\cos^2(\beta)+\cos^2(\gamma)=K^2,$$

where K is the number of counts resulting from any one of the light sensors pointing directly at the sun. In FIG. 2, K is the length of the direction vector pointing towards the sun. Please note that the term "cosine response" used above indicates that the sensor signals Sx, Sy, Sz are given as $$S_x^\pm \propto \cos(\alpha), \; S_y^\pm \propto \cos(\beta), \; S_z^\pm \propto \cos(\gamma).$$

The strength of the sensor signals Sx, Sy, Sz can be measured in terms of counts. Let the sensor signals Sx, Sy, Sz (in counts) of the $a_x$, $a_y$, and $a_z$ light sensor be given by $X^+_c$, $Y^+_c$, and $Z^+_c$, ..., respectively. Then the relative "brightness of the sun" (in counts) can be found as $$K=\sqrt{X_c^2+Y_c^2+Z_c^2}.$$

In other words without having to track the sun, e.g. by moving the whole sensor arrangement, the brightness of the sun can be monitored using the equation above. In addition, the sensor signals can be used to find the zenith angle $\gamma$ as $$\gamma = \arccos\left(\frac{Z_c}{K}\right)$$

or the elevation angle EA=90°$-\gamma$.

Next, the azimuth angle AZ of the light source, e.g. the sun, can be determined as follows. Here $X^+_c$ and $X^+_c$ are the counts of the North and South facing detectors respectively, and $Y^+_c$ and $Y^-_c$ are the counts of the West and East facing sensors respectively, and let $X_c'=\max(X^+_c,X^-_c)$ and $Y_c'=\max(Y^+_c,Y^-_c)$, wherein max( ) denotes the maximum. Then $$\delta=\arctan(Y_c'/X_c'),$$

with

AZ=$-\delta$ if in quadrant where ($X^+_c > X^-_c$ and $Y^+_c > Y^-_c$)

AZ=180°+$\delta$ if in quadrant where ($X^+_c < X^-_c$ and $Y^+_c > Y^-_c$)

AZ=180°$-\delta$ if in quadrant where ($X+_c > -Y_c$ and $Y^+_c < Y^-_c$)

AZ=+$\delta$ if in quadrant where ($X^+_c > -Y_c$ and $+Y_c > Y^-_c$).

Here, the definition of azimuth angle AZ is the conventional system of: North=0°, East=90°, South=180° and West=270°. Note that in the northern hemisphere, it will generally be the case that 90°$\leq$AZ$\leq$270°. For tracking the position of the light-source the above mentioned steps are continuously repeated and the resulting coordinates saved.

Instead of the above described initial pairwise selection of light sensors, it might be better to introduce difference signals such as $\Delta X_c = (X^+_c - X^-_c)$, $\Delta Y_c = (Y^+_c - Y^-_c)$, and $\Delta Z_c = (Z^+_c - Z^-_c)$. This would help subtract out non-sunlight related background (ambient light), and would simplify the formulas. For example, the relative "brightness of the sun" (in counts) can be found as $$K=\sqrt{\Delta X_c^2+\Delta Y_c^2+\Delta Z_c^2}.$$

Now we can find the zenith angle $\gamma$, as $$\gamma = \arccos\left(\Delta \frac{Z_c}{K}\right),$$

and the elevation angle EA=90°$-\gamma$. Then $\delta=\arctan(-\Delta Y_c/\Delta X_c)$. In computer programming the arctan function is evaluated using the a tan 2 function which accepts two signed arguments in order to always evaluate the arctangent within the proper quadrant, e.g. AZ=degrees(a tan 2($-\Delta Y_c$, $\Delta X_c$)).

Then the sun should never directly illuminate the light sensor facing to the north, as long as the sensor arrangement is used in the northern hemisphere. Correspondingly the sun should never directly illuminate the light sensor facing to the south, as long as the sensor arrangement is used in the southern hemisphere. Generally, that light sensor could be omitted.

The above introduced method can be extended to other geometries than a cube. Other geometries besides "cubes" are lower and higher order polyhedrons (see also FIGS. 1A-C). In particular, three or four faceted pyramids as well as pyramids with the apex lopped off (frustum), such as shown in FIGS. 1A-C could be populated with light sensors placed at some, e.g. excluding the bottom side or all faces. In this way the sensors point more upward towards the sky they are trying to monitor. Taking the cosine response on each light sensor as the projection onto a given position vector V, in a direction orthogonal to the face of the sensor, the concept of finding the direction of a light-source such as the sun or other pseudo point source can be generalized.

Consider a number of N light sensors, and the i'th light sensor be described by a direction vector $a_i a_x + b_i a_y + c_i a_z$, where $1 \leq i \leq N$. Further assume all light sensors have the same sensitivity and that the sensor signal or response (in number of counts) of each light sensor is given by $R_i$.

The unit vectors are no longer mutually orthogonal, and the net normalized x, y, and z components need to normalized by summing the individual responses of all light sensors and dividing that summed response by the projection of all of the light sensors onto the x, y and z axes. Let the final unit direction vector be $V_d = X a_x + Y a_y + Z a_z$, where $\sqrt{X^2 + Y^2 + Z^2} = 1$. Then each light sensor (with normal vector given by $V_i$, where $1 \leq i \leq N$, for an N detector setup) will in general have a projection onto all three axes, which can be described by $(V_i)_x$, $(V_i)_y$ and $(V_i)_z$, where $(V_i)_x = V_i \cdot a_x$, $(V_i)_y = V_i \cdot a_y$ etc. In order to find the net x, y and z responses from multiple detectors, the responses need to be normalized as well.

Figure 3A:
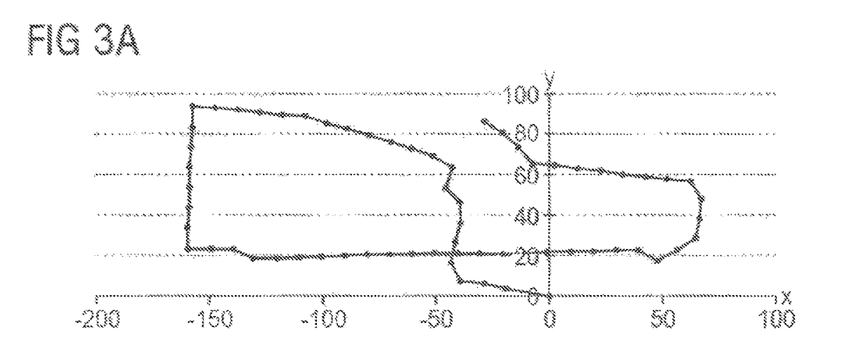
FIGS. 3A-3B show an exemplary test result of an application using a sensor arrangement according to the principle presented.
Figure 3B:
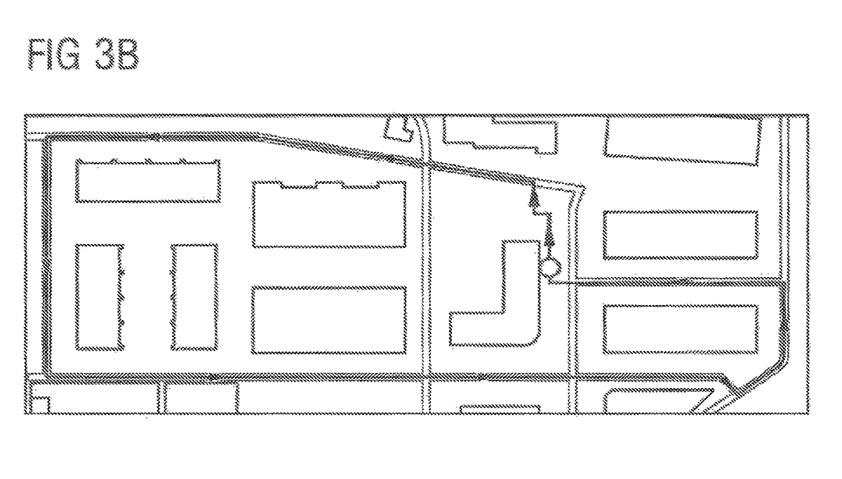

FIGS. 3A and 3B show an exemplary test result of an application using a sensor arrangement according to the principle presented. For tracking the position of the light-source the above mentioned steps are continuously repeated and the resulting coordinates saved. Then, in a next step it is possible to map to other coordinate systems, for example geographical systems. Also, knowing the date and the latitude/longitude coordinates of the site, one can also compute time from the position of the sun. Conversely, knowing the date and time and latitude/longitude, thus, being able to compute the sun's absolute position, one could use this sensor arrangement as a compass by inverting the calculations.

FIG. 3A shows the tracking result using a prototype sensor arrangement using five light sensors in a cube arrangement as introduced above. The arrangement also contained a bubble level and a compass to orient the cube to the cardinal direction points. The sensor cube was placed underneath a tinted bubble to allow the light sensors to operate in direct sunlight without saturating. The five light sensors could be interfaced via the connection means to an I²C multiplexor board which is in turn interfaced to a "PICkit Serial" module that controlled the I²C multiplexor board using, for example, a Visual Basic program to sample each light sensor in the cube in sequence and store the readings.

The whole setup was connected via a USB cable to a laptop computer inside a car to collect the tracking data. FIG. 3A shows the data plotted in an x, y representation while the car was driven around. The result shows the directional trajectory of the car in the x, y plane. For comparison FIG. 3B shows the actual trajectory on a map. This proves that the sensor arrangement is capable of accurate directional sensing. The fact that the two trajectories do not meet in the start and end point is due to the fact that the car was driven with changing speed. However, this effect can be accounted for and only occurs in moving reference systems. For stationary tracking this is no issue.

One can also determine cloudy vs. sunny conditions by examining the sensor outputs, for example by tracking the intensity of the light-source with time. Furthermore, by using color sensors, the sensors could also detect color temperature and other data which could provide further information such as partial clouded conditions, smog conditions, haze etc. Presence of haze, thin clouds and other scattering conditions could also be ascertained from the sensor information by looking at clues such as the ratio of $X^+_c$ to $X^-_c$ e.g. If, for instance, $X^-_c$ is facing south and the unit is in the northern hemisphere, then $X^-_c$ should be significantly larger that $X^+_c$ in direct sunlight. However if it is very hazy, then $(X^-_c)/(X^+_c)$ may be only slightly larger than one.

Moreover, one could be able to sense diffuse light levels in a manner similar to a diffuser dome sensor used in most lux meters, as mentioned in the beginning, by sensing a signal proportional to $\sqrt{(X_c^-)^2 + (X_c^+)^2 + (Y_c^-)^2 + (Y_c^+)^2 + (Z_c^+)^2}$.

In order for the system to function best, the sensor cube could be placed on a flat black surface to minimize effects of light picked up from the environment. The sensor might also be mounted in a shallow box to assure that the sensor only receives significant light for points ABOVE the horizon (the "horizon" will be affected by presence of nearby trees, buildings etc.).

In another embodiment (not shown) the sensor arrangement is used for a diffuse sky detector, detecting, e.g. cloudy or foggy skies verses sunny skies. Let D be a "diffusivity" index which increases for diffuse (e.g. cloudy) skies, and is near unity for sunny (non-diffuse) sky conditions. Assuming a sensor arrangement of five light sensors, then:

$$D = \frac{\sqrt{(X_c^-)^2 + (X_c^+)^2 + (Y_c^-)^2 + (Y_c^+)^2}}{\sqrt{(X_c^- - X_c^+)^2 - (Y_c^- - Y_c^+)^2}},$$

wherein the diffusivity index D will approach unity in a non-diffuse (e.g. direct sunlight) environment, but will grow large in diffuse light. For example, in direct sunlight, assuming that $X^-_c$ and $Y^+_c$ might be exposed to direct sunlight, whereas $X^+_c$ and $Y^-_c$ are shadowed. This would make the denominator term large since the differences $(X^-_c - X^+_c)$ and $(Y^-_c - Y^+_c)$ will be large, which should make D small. (I.e. a small Diffusivity index indicating that the light is direct instead of diffuse).

However, on a very cloudy day the diffuse light would scatter or distribute light in all directions such that the $(X^-_c, X^+_c)$ and $(Y^-_c, Y^+_c)$ light sensor pairs would receive almost equal amounts of light making the differences $(X^-_c - X^+_c)$ and $(Y^-_c - Y^+_c)$ very small, which makes the denominator small, thus making the diffusivity index D large, indicating diffuse light.

We claim:

1. A method for operating a sensor arrangement comprising at least a first, a second, and a third light sensor, wherein each light sensor is aligned along a face of a polyhedron-like volume, respectively, so that the sensor arrangement encloses the polyhedron-like volume, the method comprising the steps of:
  collecting, from the at least first, second, and third light sensor, respective sensor signals depending on a light source to be detected,
  determine, from the collected sensor signals, projections onto the principal axes of a three-dimensional coordinate system, wherein the projections onto the principal axes of the three-dimensional coordinate system determine components of a position vector V indicative of a position of the light source, and wherein the components of the position vector V are determined based on a scalar dot product or by the projection onto unit vectors $a_x$, $a_y$, $a_z$, respectively, and determine, from the determined projections, a direction of the light source to be detected with respect to the three-dimensional coordinate system, wherein the light sensor is aligned such that a sum of sensor signals of all light sensors meets the constraint $\cos^2(\alpha)+\cos^2(\beta)+\cos^2(\gamma)=K^2$, where K is a number of counts resulting from any one of the light sensors pointing directly at the light source and where $\alpha$, $\beta$, and $\gamma$ are given as the angles between the position vector V and the x, y, and z principal axes, respectively.

2. The method according to claim 1, wherein the light sensors generate respective sensor signals with a cosine response depending on a direction cosine when light from the light source is incident under an angle.

3. The method according to claim 1, comprising aligning the at least first, second, and third light sensors with respect to the principal axes of the three-dimensional coordinate system, respectively.

4. The method according to claim 3, wherein
the light sensors are aligned with their light sensitive surfaces along the unit vectors.

5. The method according to claim 3, wherein the step of aligning the at least first, second, and third light sensors comprises defining a continuous region of interest into which the light source to be detected emits a predetermined amount of light.

6. The method according to claim 1, wherein the at least a first, a second, and a third light sensor are further aligned to a spatially fixed reference and wherein the fixed reference is defined by coordinates $X^+$ which denotes north, $X^-$ which denotes south, $y^+$ which denotes west, and $Y^-$ which denotes east and wherein the z-axis of the three-dimensional coordinate system is aligned facing upward and downward, denoted as $Z^+$ and $Z^-$, respectively.

7. The method according to claim 1, wherein the sensor arrangement is initialized by evaluating the light sensors by pairwise comparing the sensor signals of opposing sensors, respectively.

8. The method according to claim 6, wherein the light sensor that has larger response is chosen over its opposing one for further processing and the selection of light sensor determines in which quadrant or octant of the three-dimensional coordinate system the light-source to be detected is positioned.

9. The method according to claim 8, wherein in the three-dimensional coordinate system four quadrants are defined, abbreviated as $X^+/Y^+$, $X^+/Y^-$, $X^-/Y^+$ and $X^-/Y^-$, or wherein in the case of six light sensors the pairwise comparing of the sensor signals also includes the opposing sensors along the z-axis involving unit vectors $a_z$ or $-a_z$ to determine an up/down orientation.

10. The method according to claim 1, wherein from the sensor signals a relative brightness of the light source to be detected is determined by taking the square root of the sum of squared sensor signals, or by taking the square root of the sum of squared difference signals, wherein the difference signals depend on the sensor signals.

11. The method according to claim 10, wherein the sensor signals are measured in terms of counts.

12. The method according to claim 1, wherein the direction of the light source to be detected is determined as a zenith angle, an elevation angle and/or an azimuth angle.

13. The method according to claim 1, wherein the steps of collecting sensor signals, determining the projections onto the principal axes and determining the direction of the light source to be detected is continuously repeated so as to track the direction of the light source within the three-dimensional coordinate system.

14. The method according to claim 1, wherein the three-dimensional framework comprises the polyhedron-like volume, and wherein the three-dimensional framework comprises:
a solid body having the polyhedron-like volume, and
first, second, and third connectors constituting the first, second, and third face of the polyhedron-like volume,
wherein the connectors are configured to provide electrical terminals to the at least first, second, and third light sensor.

15. The method according to claim 1, wherein the three-dimensional framework comprises a grid having an envelope comprising the polyhedron-like volume.

16. The method according to claim 1, wherein
the polyhedron-like volume comprises a four-faceted pyramid with a square base or a frustum thereof,
the first, second, and third light sensors are aligned along the first, second, and third face of the four-faceted pyramid or the frustum thereof, and
a fourth light sensor is aligned to a fourth face of the four-faceted pyramid or the frustum thereof.

17. The method according to claim 1, wherein
the polyhedron-like volume comprises a cube,
the first, second, and third light sensors are aligned along the first, second, and third face of the cube, and
the fourth light sensor is aligned along the fourth face of the cube.

18. The method according to claim 1, wherein the sensor signals are examined to determine a diffusivity index which increases for diffuse lighting and is near unity nor non-diffuse lighting conditions.

* * * * *

UNITED STATES PATENT AND TRADEMARK OFFICE
CERTIFICATE OF CORRECTION

PATENT NO. : 10,393,851 B2
APPLICATION NO. : 15/811473
DATED : August 27, 2019
INVENTOR(S) : David Mehrl and Kerry Glover It is certified that error appears in the above-identified patent and that said Letters Patent is hereby corrected as shown below:

In the Claims

Column 11
Claim 5, Line 27, after "wherein" delete "the step of".
Claim 6, Line 36, delete "$y^+$" and insert -- $Y^+$ --.

Signed and Sealed this
Sixth Day of October, 2020

Andrei Iancu
*Director of the United States Patent and Trademark Office*